(12) United States Patent
Willden

(10) Patent No.: US 6,731,421 B2
(45) Date of Patent: May 4, 2004

(54) WEDGE-SHAPED LENSLESS LASER FOCUSING DEVICE

(76) Inventor: Dee E. Willden, 1489 W. 2nd Ave., Port Washington, WI (US) 53074

( * ) Notice: Subject to any disclaimer, the term of this patent is extended or adjusted under 35 U.S.C. 154(b) by 0 days.

(21) Appl. No.: 10/126,908

(22) Filed: Apr. 19, 2002

(65) Prior Publication Data

US 2002/0154424 A1 Oct. 24, 2002

Related U.S. Application Data

(60) Provisional application No. 60/285,836, filed on Apr. 23, 2001.

(51) Int. Cl.[7] ............................................. G02B 26/02
(52) U.S. Cl. .................. 359/234; 359/232; 359/227
(58) Field of Search ................. 359/227, 232, 359/234, 856, 857

(56) References Cited

U.S. PATENT DOCUMENTS

| | | | |
|---|---|---|---|
| 3,414,354 A | 12/1968 | Siegler, Jr. .................... | 356/75 |
| 3,668,546 A | 6/1972 | Schumacher ............... | 331/94.5 |
| 3,775,609 A | 11/1973 | Dank ....................... | 240/41.35 |
| 3,826,561 A | 7/1974 | Gregg ......................... | 359/729 |
| 3,981,705 A | 9/1976 | Jaeger et al. ..................... | 65/2 |
| 4,003,638 A | 1/1977 | Winston ..................... | 359/852 |
| 4,362,361 A | 12/1982 | Campbell et al. ........... | 359/629 |
| 4,744,615 A | 5/1988 | Fan et al. ................... | 385/146 |
| 4,793,694 A | 12/1988 | Liu ............................. | 359/494 |
| 5,016,995 A | 5/1991 | Pullen ......................... | 359/366 |
| 5,211,473 A | 5/1993 | Gordin et al. .............. | 362/297 |
| 5,303,084 A | 4/1994 | Pflibsen et al. ............. | 359/503 |
| 5,343,330 A | 8/1994 | Hoffman et al. ............ | 359/708 |
| 5,442,787 A | 8/1995 | Steiner ........................ | 359/629 |
| 5,495,363 A | 2/1996 | Gast ............................ | 359/351 |
| 5,700,078 A | 12/1997 | Fohl et al. ..................... | 362/32 |
| 5,731,900 A | 3/1998 | Milner ........................ | 359/627 |
| 5,756,962 A | 5/1998 | James et al. ........... | 219/121.75 |
| 5,857,770 A | 1/1999 | Fohl et al. .................. | 362/511 |
| 5,978,407 A | 11/1999 | Chang et al. ................. | 372/72 |
| 6,147,761 A | 11/2000 | Walowit et al. ............. | 356/425 |

FOREIGN PATENT DOCUMENTS

| | | | | |
|---|---|---|---|---|
| EP | 0 771 607 | | 5/1997 | |
| EP | 1 063 049 | | 12/2000 | |
| GB | 2 044 948 | * | 10/1980 | ........... G02B/17/00 |

OTHER PUBLICATIONS

"Lasertechnologie für Geschweisste Rohre", K. Otto Welsing, Stahl und Eisen, Verlag Stahleisen GMBH, Dusseldorf, DE, No. 21, Oct. 23, 1989, pp. 999–1003.

* cited by examiner

*Primary Examiner*—Drew Dunn
*Assistant Examiner*—Joshua L Pritchett
(74) *Attorney, Agent, or Firm*—Andrus, Sceales, Starke & Sawall, LLP

(57) ABSTRACT

A lensless focusing device for receiving an unfocused laser beam and creating a desired output pattern of laser profiles. The focusing device includes a pair of wedge plates oriented at a reflective angle relative to the projection axis of the input laser beam. The focusing device generates an output pattern having a plurality of spaced laser profiles. The laser profiles include a series of fixed laser profiles and a series of adjustable laser profiles. Rotation of the focusing device about the projection axis of the input laser beam moves the adjustable laser profiles relative to the fixed laser profiles. Multiple focusing devices can be used in series with each other to generate an output pattern having a grid shape in which points on the grid are movable upon rotation of either focusing device.

16 Claims, 7 Drawing Sheets

WEDGE-SHAPED LENSLESS LASER FOCUSING DEVICE

CROSS-REFERENCE TO RELATED APPLICATION

The present application is based on and claims priority to U.S. Provisional Patent Application Ser. No. 60/285,836, filed on Apr. 23, 2001, the disclosure of which is incorporated herein by reference.

BACKGROUND OF THE INVENTION

Since the invention of lasers, optics made of glass, quartz, zinc selenide, germanium and numerous other focusing mediums shaped into the form of lenses have been used to concentrate the raw, unfocused laser beam onto targets of many types. Anti-reflective coatings have been developed and applied to the expensive optics to permit transmission of the laser beam through the lens medium. However, at extremely high powers, the unfocused laser beam rapidly degenerates the lens material.

A significant problem that occurs during the use of high-powered laser systems is the distortion of the laser beam and/or damage to the lens material. Since many of the advanced lens optics can cost hundreds or even thousands of dollars, lens damage creates a significant problem. Further, the removal and replacement of a damaged lens can result in large amounts of time lost during the actual replacement procedure.

Since current lenses are made from light-transmitting materials, environmental factors can have a large effect on the functionality of the lens. For example, humidity can create damage to the lens optics due to the condensation of water on the lens surface. Further, use of lens optics in warm environments requires the use of cooling systems.

In some applications of lasers including lenses made from light-transmitting materials, the laser is used in a harsh operating environment, such as a desert. In this type of operating environment, small particles of sand or other debris can scratch or damage the optics, thereby limiting the use of such devices.

In addition to the use of optics, alternate focusing devices include the use of mirrored focusing technology. Although mirrored focusing technology addresses some of the problems created by the currently available optics, mirrored focusing devices do not provide the required performance of costly optics.

Therefore, a need clearly exists for technology to replace both optical focusing materials for lenses and mirrored focusing technology. The use of such improved technology would allow focusing devices to be used in many different operating environments, such as space where optics can be easily degraded by cosmic radiation and solar wind. Therefore, it is an object of the present invention to provide a laser focusing device that does not utilize lens optics. Further, it is an object of the present invention to provide a focusing device that provides the required focusing while being able to be used in a harsh operating environment. A still further object of the present invention is to provide a focusing device that can be manufactured at a relatively low cost and easily replaced upon damage.

SUMMARY OF THE INVENTION

The present invention is a lensless focusing device for focusing an input, raw laser beam to create an output pattern of laser profiles. The focusing device of the present invention eliminates expensive and fragile optics while focusing an input laser beam into a usable output pattern.

The focusing device of the present invention includes a pair of wedge plate formed from a metallic material, such as aluminum, stainless steel or other reflective materials. Each of the wedge plates extends from an inlet end to a discharge end and includes a generally planar face surface that extends from the inlet end to the discharge end. The face surface of each wedge plate is a highly polished surface that reflects a laser beam upon contact of the laser beam on the polished surface.

The focusing device is formed from the pair of wedge plates each positioned at a reflection angle relative to the projection axis of the input laser beam. The wedge plate are positioned on opposite sides of the projection axis and each diverge from the projection axis at the reflection angle.

The focusing device includes an inlet opening that is defined by the distance between the inlet ends of the pair of wedge plates. The inlet opening has a width that is greater than the width of the input laser beam such that the inlet opening receives the entire input laser beam. Preferably, the pair of wedge plates are secured to each other to accurately define the width of the inlet opening.

Since the pair of wedge plates are oriented at an angle relative to the projection axis of the input laser beam, the wedge plates define a discharge opening having a width less than the width of the inlet opening. Further, the size of the wedge plates and the reflection angle insures that the width of the discharge opening is less than the width of the input laser beam such that the input laser beam is reflected off of the pair of face surfaces of the wedge plate toward the discharge opening.

As the individual light beams of the input laser beam are reflected toward the discharge opening, the focusing device creates an output pattern of individual laser profiles. In one embodiment of the invention, the output pattern includes a plurality of spaced laser profiles that each take the form of an elongated laser line. The individual laser profiles are spaced from each other to define the output pattern.

The output pattern from the single focusing device includes a plurality of fixed laser profiles and a plurality of adjustable laser profiles. The adjustable laser profiles are each positioned between two of the fixed laser profiles. When the focusing device is rotated about the projection axis, the adjustable laser profiles move in either direction relative to the fixed laser profiles. For example, if the focusing device is rotated in a counter-clockwise direction, the adjustable laser profiles move left when viewed from above. Likewise, if the focusing device is rotated in a clockwise direction, the adjustable laser profiles move to the right. By rotating the focusing device, the distance between the adjustable and fixed laser profiles can be adjusted to create a unique output pattern.

The lensless focusing device of the invention utilizes a pair of solid wedge plates to create an output pattern having multiple laser profiles. The multiple laser profiles can be used in many applications, such as isotope separation in a nuclear material.

In a second embodiment of the invention, a pair of focusing devices are positioned in series along the projection axis of the input laser beam. The first focusing device receives the input laser beam and generates the output pattern having a series of spaced laser profiles. The output pattern from the first focusing device is then received within the inlet opening for the second focusing device. The second focusing device is rotated 90° relative to the first focusing device such that the entire first output pattern is received within the inlet opening of the second focusing device.

The multiple, spaced laser profiles from the first focusing device fall onto the face surfaces of the second focusing device and create a second output pattern from the discharge end of the second focusing device. In the embodiment of the invention discussed, the second output pattern has a grid shape in which multiple points on the grid are adjustable, while other points on the grid are fixed. The movement of the adjustable grid profiles can be controlled by rotating either the first focusing device or the second focusing device along the projection axis of the input laser beam.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
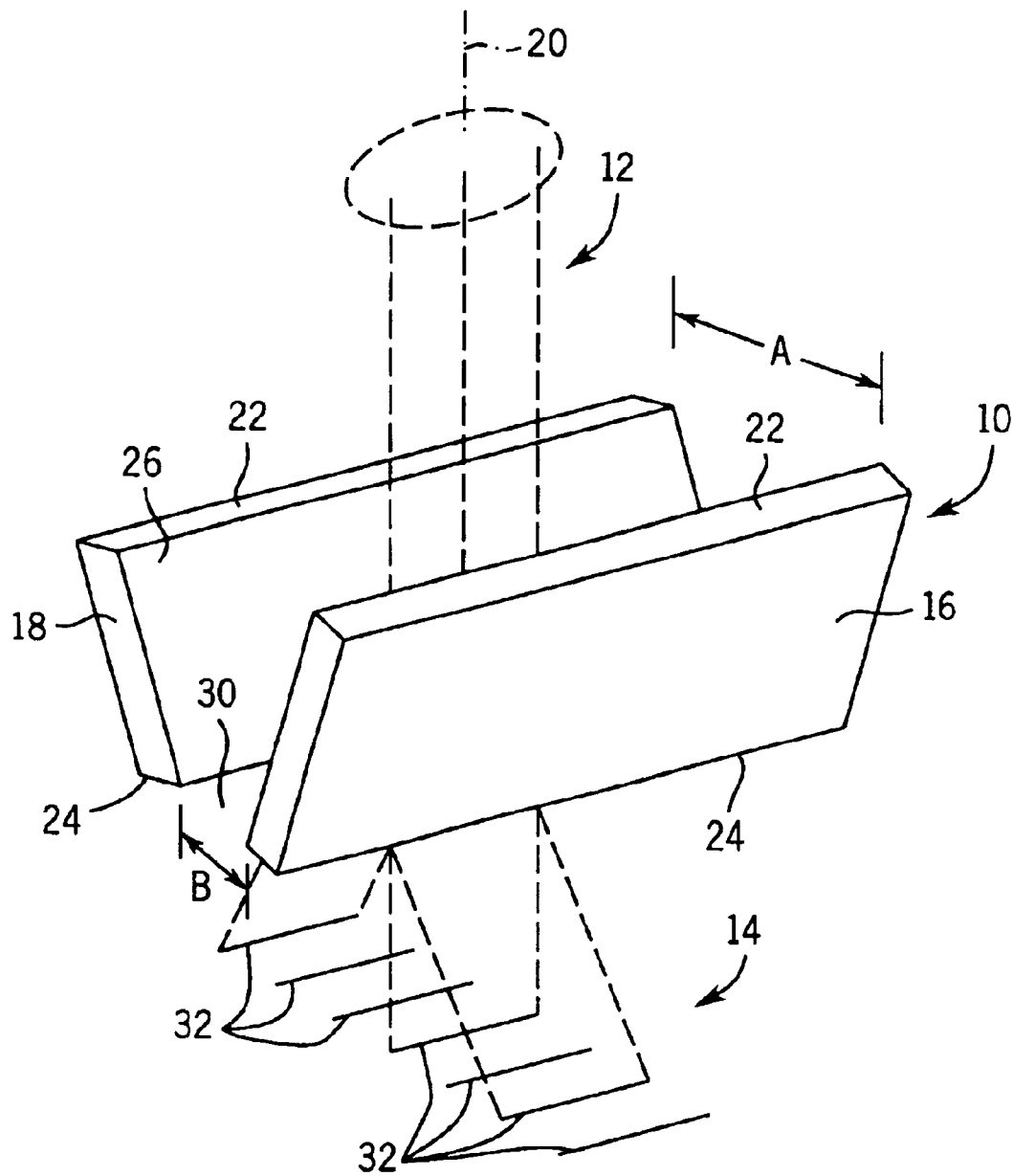
FIG. 1 is a perspective view illustrating the lensless focusing device of the present invention as receiving a raw, input laser beam and generating multiple output laser profiles.

FIG. 1 illustrates a lensless focusing device 10 of the present invention. The focusing device 10 is shown as being utilized to focus a raw, unfocused input laser beam 12 from a source (not shown) to create an output pattern 14, the features of which will be described in greater detail below. The output laser pattern 14 can be used for many different applications, as will also be described in detail below.

In the first embodiment of the invention illustrated in FIG. 1, the focusing device 10 includes a pair of wedge plates 16, 18 that are positioned along opposite sides of the projection axis 20 of the input laser beam 12. The wedge plates 16, 18 each extend between an inlet end 22 and a discharge end 24. In the embodiment of the invention illustrated in FIG. 1, each of the wedge plates 16, 18 is a rectangular, plate-shaped structure, although other forms of the wedge plates 16, 18 are contemplated as being within the scope of the present invention.

Figure 2:
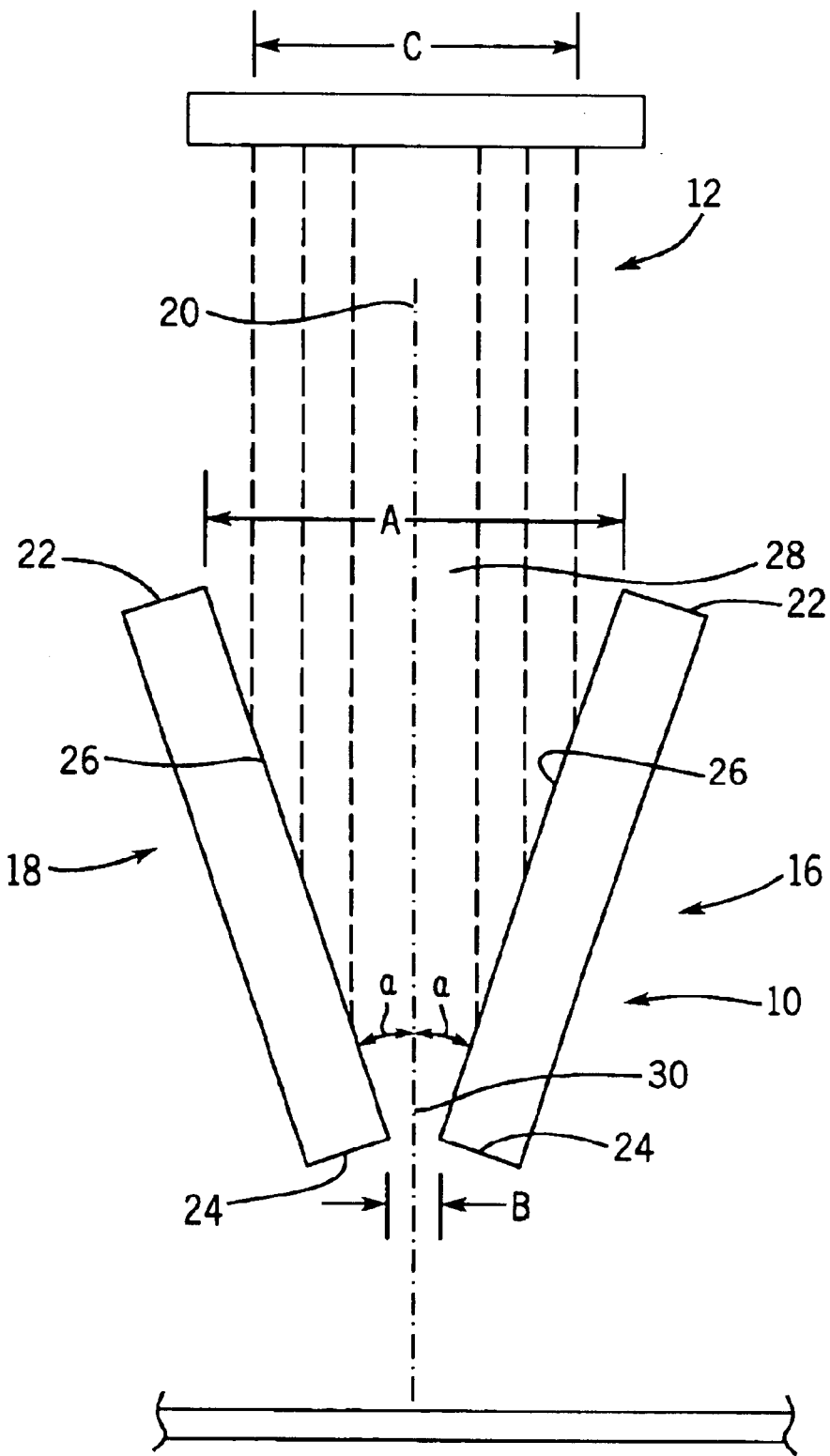
FIG. 2 is a side view illustrating the position of the lensless focusing device relative to the input laser beam.

Referring now to FIG. 2, each of the wedge plates 16, 18 includes a planar face surface 26 that is positioned facing the projection axis 20 to receive the input laser beam 12. In the preferred embodiment of the invention, the face surface 26 is a highly polished surface that reflects the input laser beam 12, as illustrated. In the embodiment of the invention illustrated in FIGS. 1 and 2, the wedge plates 16, 18 are each formed from a metallic material, such as stainless steel, aluminum or other reflective material. Although the wedge plates are shown as being rectangular, plate-like members, the wedge plates 16, 18 could have many other shapes as long as the wedge plates 16, 18 included the face surface 26 to reflect the input laser beam.

As can be seen in FIG. 2, the inlet ends 22 of the pair of wedge plates 16, 18 located on opposite sides of the projection axis and are spaced from each other to define an inlet opening 28. The inlet opening 28 has a width A centered along the projection axis 20 of the input laser beam 12. As can be clearly seen in FIG. 2, the width A of the inlet opening 28 is greater than the width C of the laser beam 12 such that the entire laser beam 12 enters into the focusing device 10 through the inlet opening 28.

As can be seen in FIG. 2, the wedge plates 16, 18 are each positioned at opposite reflection angles $\alpha$ relative to the projection axis 20 of the input laser beam. The reflection angle $\alpha$ orients the wedge plates 16, 18 such that the wedge plates define the discharge opening 30 between the discharge ends 24 of the wedge plates 16, 18. As illustrated, the discharge opening 30 has a width B that is significantly less than the width A of the inlet opening and the width C of the input laser beam 12.

In a preferred embodiment of the invention, the reflection angle $\alpha$ between the wedge plates 16, 18 and the projection axis 20 is approximately between 3.5° to 4.5° such that the width A of the inlet opening is approximately 1.015 inches and the width B of the discharge opening 30 is approximately 0.014 inches. Although these measurements are given as an example of the configuration for the focusing device 10 of the present invention, it should be understood that the focusing device 10 can have different sizes and configurations while operating within the scope of the present invention. Additionally, it is contemplated by the inventor that the inlet ends 22 of the pair of wedge plates 16, 18 can be moved closer and farther away from each other during use of the focusing device 10 to vary the width of the inlet opening 28.

Referring back to FIG. 1, the focusing device 10 of the present invention receives the input laser beam 12 and reflects the laser beam off of the face surfaces 26 to generate the output pattern 14, as illustrated. In the embodiment of the invention illustrated in FIG. 1, the output pattern 14 includes a plurality of spaced laser profiles 32 that are projected from the discharge opening 30. In FIG. 1, the laser profiles 32 are shown as a series of spaced lines projected onto a planar surface. Although FIG. 1 illustrates the laser profiles 32 as spaced lines, it should be understood that the laser profiles 32 are each projected away from the discharge opening at diverging angles such that the separation between the individual lines increases the further the focusing surface is from the discharge opening 30.

Figure 3:
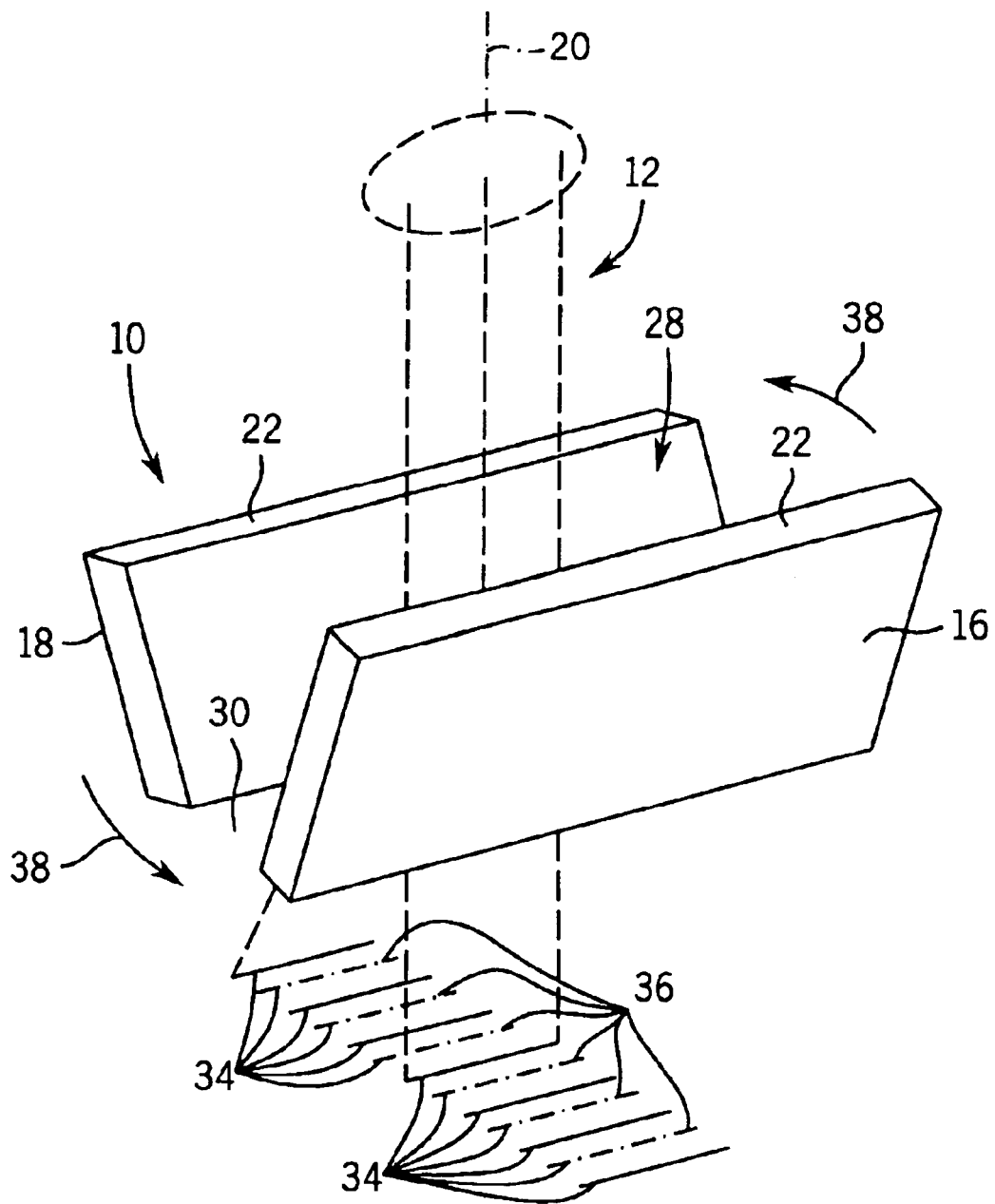
FIG. 3 is a perspective view similar to FIG. 1 illustrating the movement of alternate laser profiles as the focusing device is rotated about a projection axis of the input laser beam.

Referring now to FIG. 3, thereshown is the operation of the focusing device 10 of the present invention to create an output pattern having a plurality of fixed laser profiles 34 and a plurality of adjustable laser profiles 36. In the embodiment of the invention illustrated in FIG. 1, the fixed laser profiles and adjustable laser profiles are positioned on top of each other to define the laser profiles 32. In the embodiment of the invention illustrated in FIG. 3, the fixed laser profile 34 and the adjustable laser profile 36 are separated by rotating the focusing device 10 about the projection axis 20, as illustrated by arrows 38. Although the arrows 38 in FIG. 3 illustrate rotation of the focusing device 10 in a counter-clockwise direction when viewed from above, it is contemplated that the focusing device 10 could also be rotated in the clockwise direction, as will be described in detail below.

In the preferred embodiment of the invention, the wedge plates 16, 18 are secured to each other such that rotation of the focusing device 10 results in the simultaneous rotation of the wedge plates 16, 18 about the projection axis. Since the wedge plates 16, 18 are secured to each other, rotation of the focusing device 10 maintains the distance between the inlet ends 22 that defines the inlet opening 28. As the focusing device 10 rotates, the fixed laser profiles 34 remain stationary while the adjustable laser profiles 36 move between the fixed laser profiles 34.

Figure 4A:
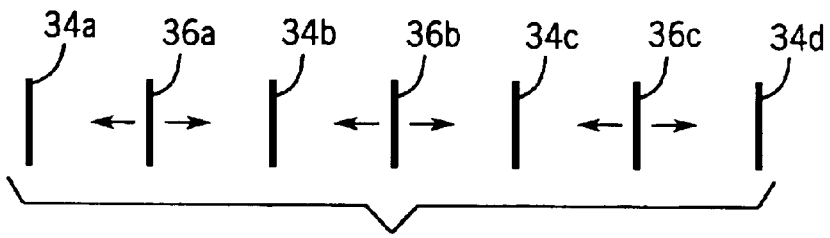
FIGS. 4a–4e illustrate the movement of alternate laser profiles as the focusing device is rotated as indicated in FIG. 3.

Referring now to FIG. 4a, thereshown is a typical output pattern from the focusing device 10 of the present invention. As illustrated, the output pattern includes a series of fixed laser profiles 34a–d and a plurality of adjustable laser profiles 36a–c. As illustrated in FIG. 4a, the adjustable laser profiles 36a–c are positioned between the fixed laser profiles 34a–d such that every other laser profile is movable. As illustrated in FIG. 4a, each of the adjustable laser profiles 36a–c is movable in either direction, depending upon the direction of rotation of the focusing device 10 relative to the projection axis 20.

Figure 4B:
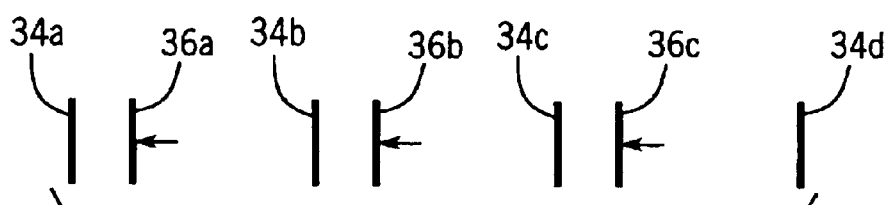
Figure 4C:
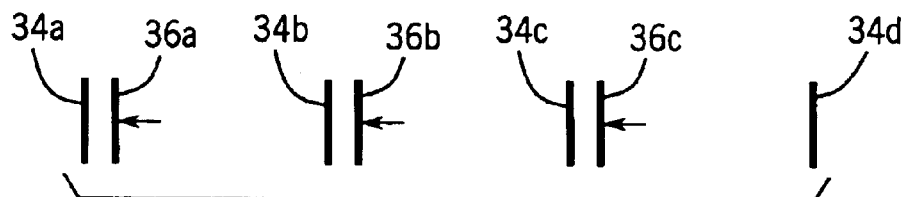
Figure 4D:
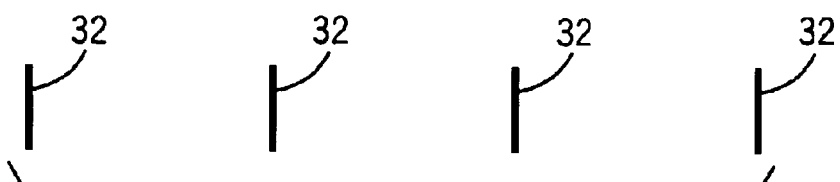

In FIG. 4b, the focusing device 10 is rotated in a counter-clockwise direction, which causes each of the adjustable laser profiles 36a–c to move left toward one of the fixed laser profiles 34a–c. Further rotation of the focusing device 10 causes the adjustable laser profiles 36a–c to move closer to the fixed laser profiles 34a–c until the adjustable laser profiles 36a–c are on top of the fixed laser profiles 34a–c. FIG. 4d illustrates the appearance of only four laser profiles when the adjustable laser profiles 36a–c are on top of the fixed laser profiles 34a–c. Although four laser profiles are shown, it is contemplated that different numbers of profiles could be present.

Figure 4E:
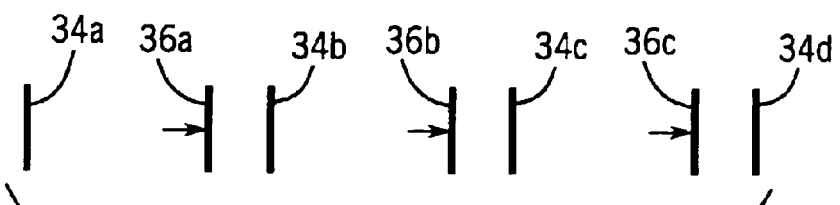

FIG. 4e illustrates the movement of the adjustable laser profiles 36a–c as the focusing device 10 is rotated in an opposite, clockwise direction. As illustrated, the adjustable laser profiles 36a–c now move to the right toward the respective fixed laser profiles 34b–d. Further rotation of the focusing device in the clockwise direction will result in the adjustable laser profiles 36a–c becoming aligned with the fixed laser profiles 34b–d.

As can be understood in FIGS. 4a–e, the rotation of the focusing device 10 about the projection axis 20 results in a varying pattern of the fixed laser profiles 34a–d and the adjustable laser profiles 36a–c. It is contemplated that the adjustable output pattern can be utilized for many different applications, such as burning an adjustable bar code onto a surface, determining the alignment of various structures, or a signature of the output pattern for detection and interpretation, and other useful and novel applications. In addition, the focusing device could also be used with other types of electromagnetic radiation while falling within the scope of the present invention.

Figure 7:
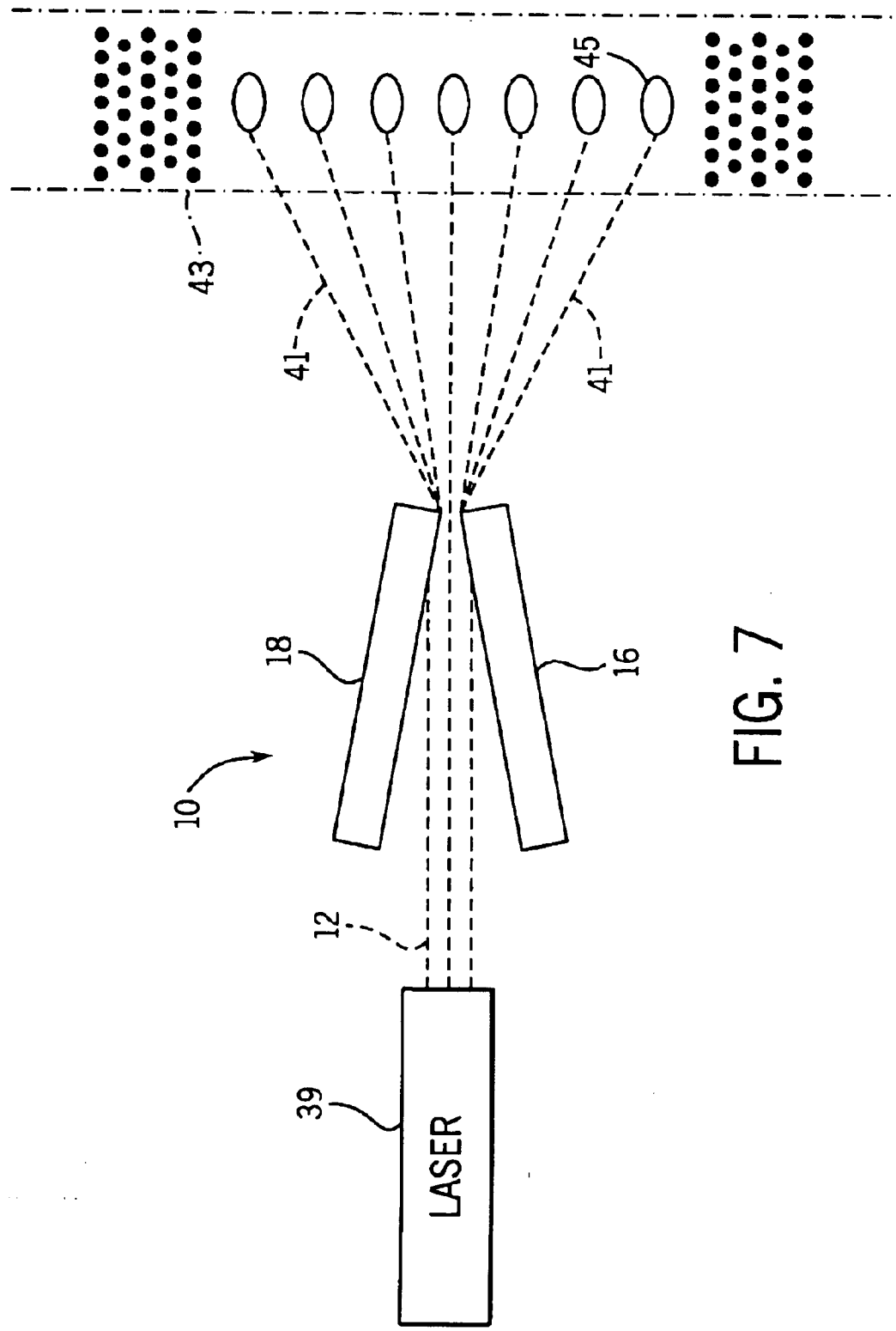
FIG. 7 is a side view illustrating one potential use of the lensless focusing device of the present invention to produce isotope separation at multiple work sites.

Referring now to FIG. 7, thereshown is one contemplated use of the lensless focusing device 10 of the present invention. As illustrated, the lensless focusing device 10 receives the inlet laser beam 12 from a laser source 39. The inlet laser beam 12 is separated into a plurality of individual beams 41. In the embodiment of the invention illustrated, the individual laser beams 41 are used to produce isotope separation for nuclear materials at multiple locations. As illustrated in FIG. 7, a magnetic field 43 is developed and the multiple laser beams pass through the magnetic field 43 and generate individual plasmas which can effect isotope separation. The lensless laser focusing device 10 of the present invention has the advantage of creating multiple work site plasmas from a single input laser beam. The system illustrated in FIG. 7 can be pushed to high levels of laser output, which allows for the production of plasma propagation and thus the potential for isotope separation using the plasma in a magnetically confined or directed environment or bottle. Laser Q-switching is employed to generate the plasmas. Although multiple lasers may be the system of choice in present, plasma separation of isotopes, it is clear that the lensless focusing device 10 of the invention has the advantage of simplicity over the cumbersome multiple laser systems.

As can be seen in FIGS. 1–3, the focusing device 10 is formed from a durable, metallic material that can resist damage and scratching in a harsh use environment. Further, the simple design of the focusing device 10 creates an adjustable pattern that can be utilized for various different applications.

Figure 5:
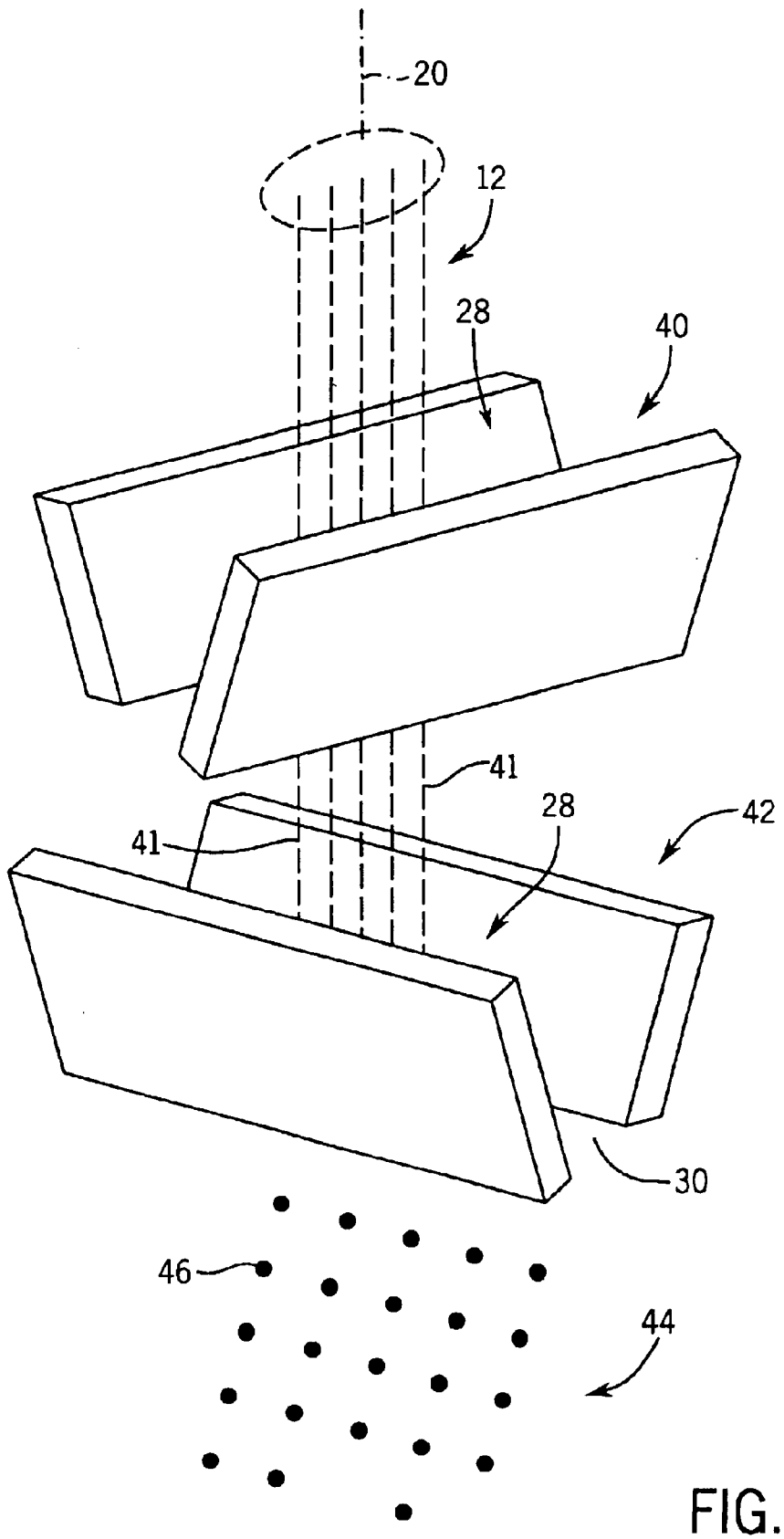
FIG. 5 is a second embodiment of the present invention illustrating the use of a pair of wedge-shaped lensless focusing devices with a raw, input laser beam and the generation of multiple laser impact profiles.

Referring now to FIG. 5, thereshown is an alternate use of the focusing device 10 of the present invention. As illustrated in FIG. 5, the embodiment utilizes a first focusing device 40 and a second focusing device 42. Both of the focusing devices 40, 42 are identical to the focusing device 10 illustrated in FIGS. 1–3. As illustrated in FIG. 5, the first focusing device 40 is positioned along the projection axis 20 such that the entire input laser beam 20 is received through the inlet opening 28. As described previously, the first focusing device 40 creates an output laser pattern similar to that shown in FIG. 1. Specifically, the output from the first focusing device 40 is a series of spaced lines that include both fixed and adjustable laser profiles.

The multiple output beams 41 from the first focusing device are received within the inlet opening 28 of the second focusing device 42. As illustrated in FIG. 5, the second focusing device 42 is also positioned along the projection axis 20 of the input laser beam 12. However, the second focusing device 42 is rotated 90° relative to the first focusing device 40.

As illustrated in FIG. 5, the output pattern 44 for the combination of the first focusing device 40 and the second focusing device 42 is a grid-shaped pattern including a plurality of individual laser profiles 46. In the embodiment of the invention illustrated in FIG. 5, the laser profiles 46 each take the shape of a single dot in a grid-shaped pattern. Each of the laser profiles 46 is directed out of the discharge opening 30 of the second focusing device 42 and projected onto a surface, as shown in FIG. 5. However, it should be understood that each of the laser profiles 46 are defined by a beam of light that can be projected for a distance and over an uneven surface.

Figure 6:
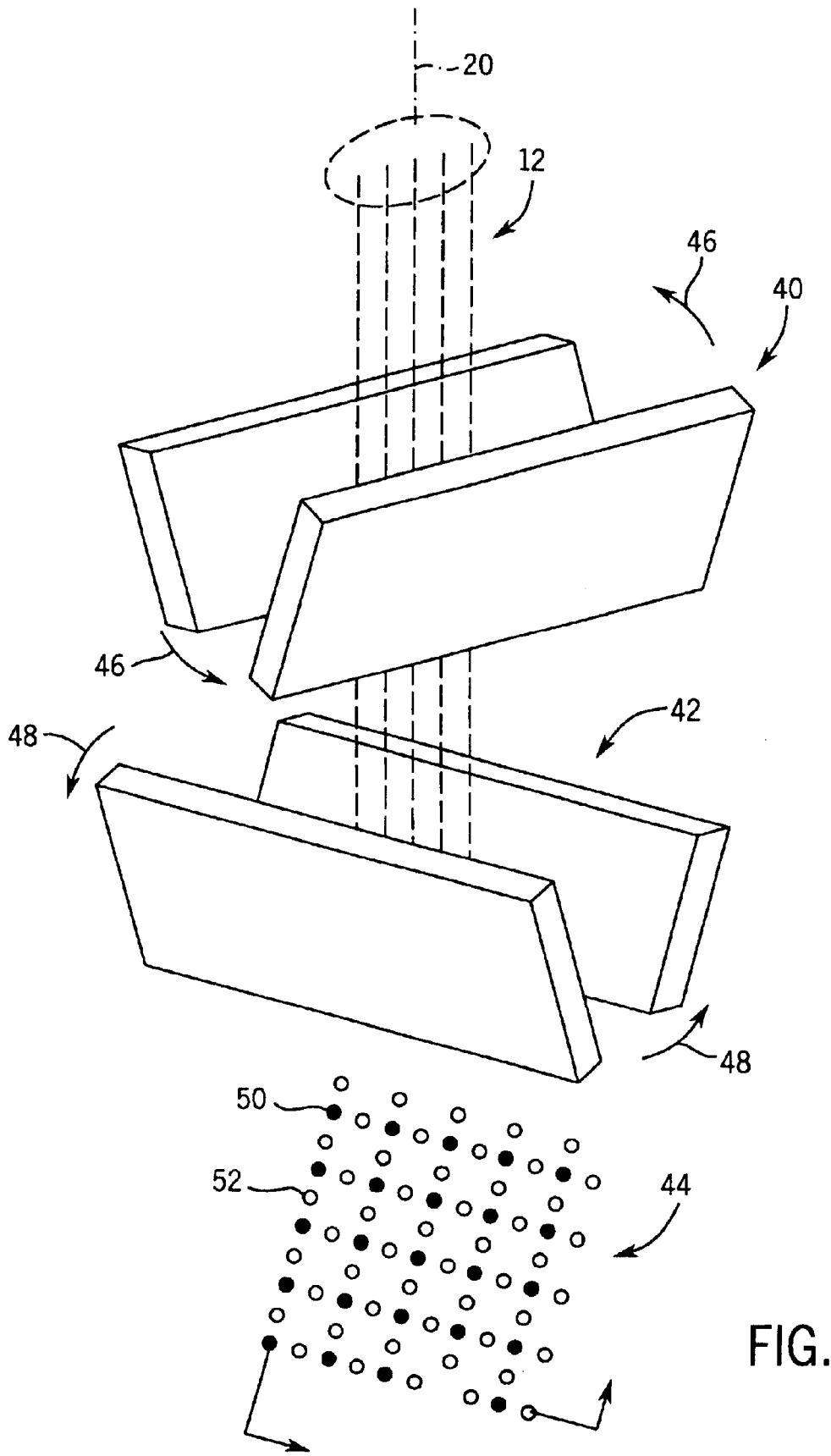
FIG. 6 is a perspective view similar to FIG. 4 illustrating the rotation of each lensless focusing device about the projection axis and the movement of alternate impact profiles as the focusing devices are rotated.

Referring now to FIG. 6, the first focusing device 40 can be rotated about the projection axis 20, as illustrated by arrows 46. Likewise, the second focusing device 42 can be rotated about the projection axis 40, as illustrated by arrows 48. Since both the first focusing device 40 and the second focusing device 42 can be independently rotated, the grid pattern 44 can vary in many different ways. As illustrated in FIG. 6, the grid pattern includes a plurality of fixed laser profiles 50 and a plurality of adjustable laser profiles 52. As the first and second focusing devices 40, 42 are rotated, the adjustable laser profiles 50 are movable between the fixed laser profiles 52. Thus, the output pattern 44 can be adjusted by rotating either the first focusing device 40 or the second focusing device 42.

Although many uses are contemplated for the pair of focusing devices 40, 42 illustrated in FIGS. 5 and 6, it is contemplated by the inventor that the grid-shaped output pattern 44 could be utilized to verify the surface configuration of curved objects from a distance. Additionally, the grid pattern 44 could be utilized to detect out of position articles in many types of operating situations.

As can be understood by the foregoing description, the focusing device of the present invention allows the user to receive an unfocused, input laser beam and create an output pattern having various spaced laser profiles. The output pattern can be utilized for different functions as desired by the user. However, the focusing device of the present invention eliminates the need for expensive and delicate optics while providing for a focusing device that manipulates an otherwise unfocused input laser beam.

Various alternatives and embodiments are contemplated as being within the scope of the following claims particularly pointing out and distinctly claiming the subject matter regarded as the invention.

I claim:

1. An apparatus for focusing an input laser beam projected along a projection axis, the apparatus comprising:
   a first wedge plate extending from an inlet end to a discharge end, the first wedge plate being positioned at a reflection angle relative to the projection axis of the input laser beam; and
   a second wedge plate extending from an inlet end to a discharge end, the second wedge plate being positioned at the reflection angle relative to the projection axis in a direction opposite the first wedge plate,
   wherein the inlet end of the first wedge plate and the inlet end of the second wedge plate are separated by an inlet opening and the discharge end of the first wedge plate and the discharge end of the second wedge plate are separated by a discharge opening, wherein the width of the inlet opening is greater than the width of the input laser beam and the width of the discharge opening is less than the width of the input laser beam,
   wherein the first wedge plate and the second wedge plate are rotatable about the projection axis and maintain the reflection angle between the first and second wedge plates and the projection axis during said rotation, wherein rotation about the projection axis adjusts the output pattern of the focusing device.

2. The apparatus of claim 1 wherein both the first wedge plate and the second wedge plate include a polished face surface, wherein the first and second wedge plates are positioned such that the input laser beam contacts and is reflected off of the polished face surface on each of the first and second wedge plates.

3. The apparatus of claim 1 wherein the first and second wedge plates are formed from a metallic material.

4. The apparatus of claim 1 wherein the first wedge plate is connected to the second wedge plate such that the first wedge plate and the second wedge plate rotate in unison about the projection axis.

5. The apparatus of claim 1 wherein the distance between the inlet end of the first wedge plate and the inlet end of the second wedge plate is adjustable.

6. A method of creating an output pattern from an unfocused laser beam being projected along a projection axis, the method comprising the steps of:
   positioning a first wedge plate at a reflection angle relative to the projection axis, the first wedge plate including a face surface extending from an inlet end to a discharge end;
   positioning a second wedge plate at the reflection angle relative to the projection axis, the second wedge plate extending in an opposite direction relative to the first wedge plate, the second wedge plate including a face surface extending from an inlet end to a discharge end;
   positioning the first wedge plate relative to the second wedge plate to define an inlet opening between the inlet ends of the first and second wedge plates and a discharge opening between the discharge ends of the first and second wedge plates;
   positioning the first and second wedge plates along the projection axis such that the input laser beam is received within the inlet opening, wherein the input laser beam is reflected off of the face surfaces and out of the discharge opening to define the output pattern; and
   simultaneously rotating the first and second wedge plates about the projection axis while maintaining the reflection angle of both the first and second wedge plates relative to the projection axis to adjust the spacing between the plurality of spaced laser profiles.

7. The method of claim 6 wherein the output pattern includes a plurality of spaced laser profiles.

8. The method of claim 7 wherein the output pattern includes a plurality of fixed laser profiles and a plurality of adjustable laser profiles.

9. The method of claim 8 wherein the step of simultaneously rotating the first and second wedge plates about the projection axis moves the adjustable laser profiles relative to the fixed laser profiles.

10. The method of claim 6 wherein the face surfaces of both the first wedge plate and the second wedge plate are polished.

11. The method of claim 6 wherein the width of the inlet opening is greater than the width of the input laser beam and the width of the discharge opening is less than the width of the input laser beam.

12. The method of claim 6 wherein both the first wedge plate and the second wedge plate are formed from a metallic material.

13. A method of creating an output pattern from an unfocused laser beam being projected along a projection axis, the method comprising the steps of:
   positioning a first focusing device along the projection axis, the first focusing device having an inlet opening and a discharge opening, wherein the first focusing device receives the input laser beam through the input opening and creates a first output pattern from the discharge opening;
   positioning a second focusing device along the projection axis, the second focusing device being rotated 90° about the projection axis relative to the first focusing device and positioned to receive the first output pattern from the first focusing device, wherein the second focusing device generates a second output pattern including a plurality of spaced laser profiles;
   selectively rotating the first focusing device about the projection axis to adjust the spacing between the plurality of spaced laser profiles; and
   selectively rotating the second focusing device about the projecting axis to adjust the spacing between the plurality of spaced laser profiles.

14. The method of claim 13 wherein the first focusing device and the second focusing device each comprise:
- a first wedge plate having a face surface extending from an inlet end to a discharge end, the first wedge plate being positioned at a reflection angle relative to the projection axis;
- a second wedge plate having a face surface extending from an inlet end to a discharge end, the second wedge plate being positioned at the reflection angle relative to the projection axis and opposite the first wedge plate,
- wherein the distance between the inlet end of the first wedge plate and the inlet end of the second wedge plate define the inlet opening and the distance between the discharge end of the first wedge plate and the discharge end of the second wedge plate define the discharge opening.

15. The method of claim 14 wherein the width of the inlet opening is greater than the width of the input laser beam and the width of the discharge opening is less than the width of the input laser beam.

16. The method of claim 14 wherein the first wedge plate and the second wedge plate of both the first focusing device and the second focusing device include a polished face surface.

* * * * *